Jan. 17, 1933.                F. W. MEYER                 1,894,883
                            MOTOR FOR TREE SAWS
                            Filed June 4, 1929             2 Sheets-Sheet 1

Inventor
Friedrich Wilhelm Meyer
By B. Singer, Atty.

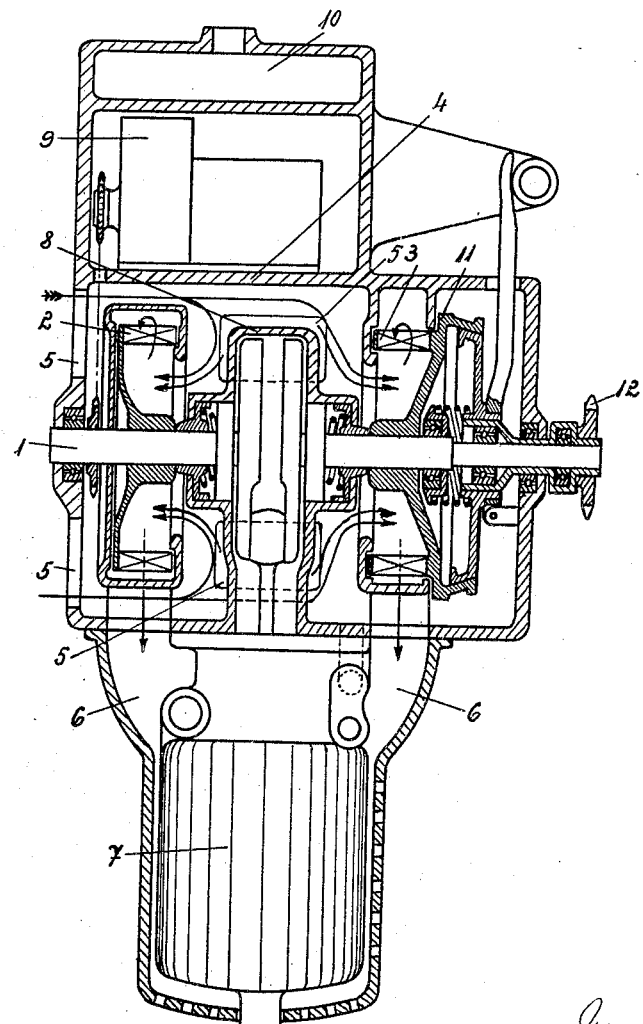

Patented Jan. 17, 1933

1,894,883

UNITED STATES PATENT OFFICE

FRIEDRICH WILHELM MEYER, OF VIENNA, AUSTRIA, ASSIGNOR TO URAL-MASCHINEN-VERTRIEBSGESELLSCHAFT M. B. H., OF VIENNA, AUSTRIA

MOTOR FOR TREE SAWS

Application filed June 4, 1929, Serial No. 368,305, and in Austria June 6, 1928.

With the tree saw motor as described in application for patent, Serial No. 285,535, it has been found that the cooling and cleaning effect of the air current is not quite satisfying. It seems necessary to conduct the air in such a manner that it flows through the fan casing and the housing in a line as straight as possible i. e. without its flow being disturbed by curves, cooling thereby the cylinder and the crank case.

In order to attain this aim, fans have been provided on both sides of the crank shaft according to this invention, which draw in the air conveying it through a common air duct which surrounds the cylinder housing to the outlet openings of the housing, the fans being so located in the casing that the cooling air is directly supplied to the housing, where it is compressed to a certain extent in order to blow away sawdust and particles of dirt, if any, getting into the neighbourhood of the cylinder.

In order to cool the crank case, which especially with two-stroke cycle engines is bound to attain high temperatures entailing an excessive heating of the gas mixture and a reduction of the engine power, the air drawn in by the fan is so conducted as to flow round the crank case before entering the cylinder housing. This purpose is best attained by having the air pass along the crank case before reaching the fan, the blades being so arranged and the fans so designed as to draw in the air from the inside i. e. along the crank case wall.

The fans are located in a common casing so that the air is drawn in through one or several openings common for both fans in any case. If there is only one fan, same is placed behind the crank case so that the air drawn in is forced to flow round the crank case before entering the fan. It is therefore located on the side of the casing opposite to the air admission openings. This casing which serves as suction casing or as air duct for the air drawn in by the fans, has its air openings therefore on the side remote from the saw chain.

It has further been found that placing the magneto in the air duct is unfavorable and disturbs the regular air flow. In order to drive the air through the cylinder casing with the necessary speed and the pressure required all devices not furthering the supply of the air must be eliminated. This is the reason why the magneto was placed in the gasoline tank and the saw coupling into the fan casing on the side remote from the air admission openings.

Figure 1:
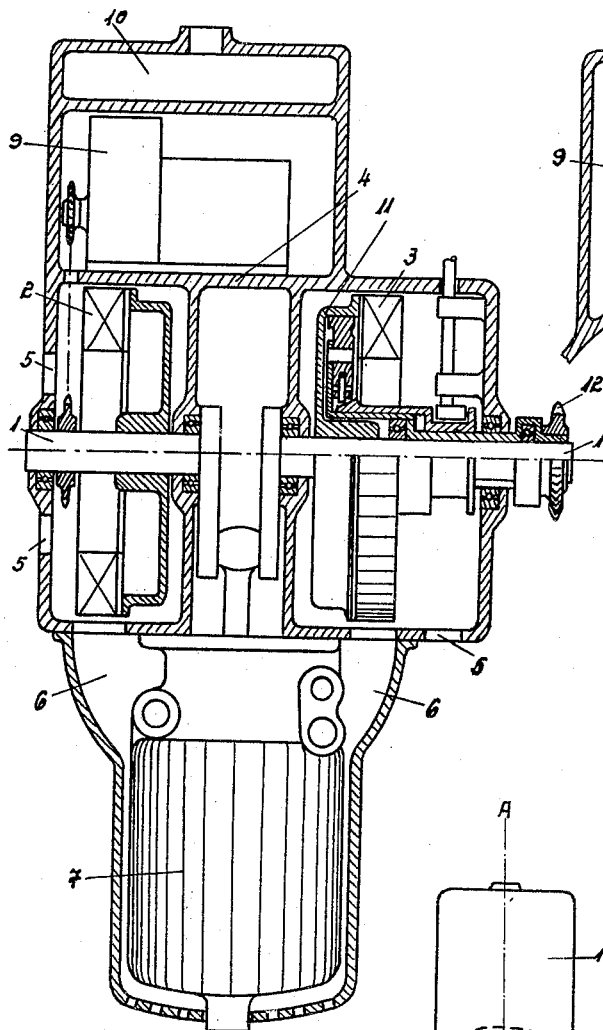
Figure 2:
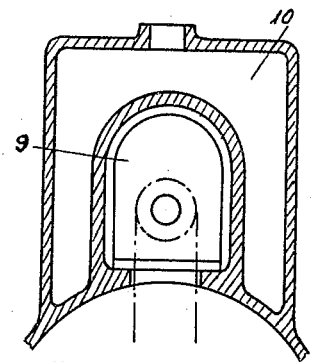
Figure 3:
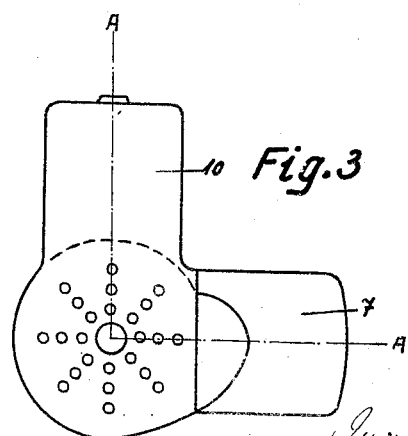

In the drawings two modes of execution of the subject matter of this invention have been reproduced by way of an example, Fig. 1 showing an angular section through the motor along the line A—A of the Fig. 3 of a form of the invention including a noncooled crank case, Fig. 2 being a cross section through the gasoline tank with the igniting magneto located in same, Fig. 3 an elevation of the motor seen from the cylinder side on a reduced scale, Fig. 4 an angular section along to the line A—A of the Fig. 3 of a motor constructed according to a modification of the invention and fitted with a crank case cooled by fans.

With the form of the invention according to the Fig. 1, 2 and 3 the fans 2 and 3 are arranged on the crank shaft 1 on both sides of the crank. Openings 5 are provided in the fan casing as admission openings for the air. The fans are so located that the air supplied by same is directly forced into the housing 6 of the cylinder 7 without being hindered in its free flow by a corner.

With the form of the invention according to the Fig. 4 the fans 2 and 3 are also fixed to the crank shaft 1 so that they force the air directly into the cylinder casing 6. But they are not arranged in such a manner that they do not draw in the air directly through the admission openings 5 but so that the air before reaching the fans is compelled to flow past the crank case 8 cooling it thereby. As the air before getting to the fans is forced to take the round about way by the crank case, it will—though cooling the crank case—not be influenced after leaving the fans neither with regard to its speed nor to its pressure and will exercise the same effect in the cylinder casing as if it had directly been admitted to the fans 2, 3 by way of the openings 5.

If only one fan is placed on the shaft 1, it should be arranged just as the fan 3 (Fig. 4) on the side of the casing 4 opposite to the admission openings 5 behind the crank case 8. The air drawn in will flow over the crank case and cool it before entering the fan.

In order to keep the path of the air undisturbed and free the igniting magneto 9, which hitherto had been located in the crank case has been mounted in the gasoline tank 10 whilst the coupling 11 of the saw chain wheel 12 is so being arranged in the casing 4 that the air flowing to the fans gets at same without being hindered in its way by the coupling.

According to the form of the invention shown in Fig. 4 the fan casing is so arranged that it encloses both fans as a common suction casing or a common suction duct in which the crank case is placed.

What I claim is:

1. An internal combustion motor comprising a fan casing having air inlet openengs, a housing extending from one side of the fan casing communicating therewith and having air discharge openings at its outer end, a cylinder in the housing and spaced from the wall thereof, a crank shaft extending through and having bearings in the fan casing and fans on the crank shaft on opposite sides of the crank thereof, to force cooling air directly from the fans through the housing and thence around the cylinder.

2. A motor as claimed in claim 1 including a coupling on the crank shaft arranged beside one of the fans and on the side remote from the air inlet openings.

3. A motor as claimed in claim 1, including also a crank case in the fan casing and between the fans, the walls of the crank case being in the paths of the air currents in the fan casing, so that said walls are air cooled and also serve to deflect the air currents into the housing.

4. A motor as claimed in claim 1, including also a crank case in the fan casing and between the fans and also between discharge openings in the fan casing, which openings establish communication between the fan casing and the housing.

In testimony whereof I affix my signature.

FRIEDRICH WILHELM MEYER.